US010435873B2

United States Patent
Lee et al.

(10) Patent No.: US 10,435,873 B2
(45) Date of Patent: Oct. 8, 2019

(54) FAUCET COUPLING STRUCTURE

(71) Applicants: Do Kyeng Lee, Siheung-si, Gyeonggi-do (KR); Choong Bum Ahn, Gongju-si, Chungcheongnam-do (KR)

(72) Inventors: Do Kyeng Lee, Siheung-si (KR); Yong Woon Lee, Seoul (KR)

(73) Assignees: Do Kyeung Lee (KR); Choong Bum Ahn (KR)

( * ) Notice: Subject to any disclaimer, the term of this patent is extended or adjusted under 35 U.S.C. 154(b) by 0 days.

(21) Appl. No.: 15/661,530

(22) Filed: Jul. 27, 2017

(65) Prior Publication Data
US 2017/0321399 A1    Nov. 9, 2017

Related U.S. Application Data

(63) Continuation-in-part of application No. PCT/KR2016/006952, filed on Jun. 29, 2016.

(30) Foreign Application Priority Data

Jun. 30, 2015    (KR) .................. 10-2015-0092603

(51) Int. Cl.
*E03C 1/04* (2006.01)
*F16L 19/06* (2006.01)
(Continued)

(52) U.S. Cl.
CPC ............ *E03C 1/0403* (2013.01); *E03C 1/042* (2013.01); *F16L 19/062* (2013.01); *F16L 19/065* (2013.01)

(58) Field of Classification Search
CPC .......... E03C 1/0402; E03C 1/042; E03C 1/04; E03C 1/0403
(Continued)

(56) References Cited

U.S. PATENT DOCUMENTS

| 4,964,657 | A  | * | 10/1990 | Gonzales | .............. | F16L 19/086 |
|           |    |   |         |          |                | 285/332 |
| 8,303,001 | B2 | * | 11/2012 | Oh       | ...................... | F16L 25/0045 |
|           |    |   |         |          |                | 285/340 |
| 2013/0049351 | A1 | * | 2/2013 | Chen    | ...................... | E03C 1/021 |
|           |    |   |         |          |                | 285/33 |

FOREIGN PATENT DOCUMENTS

| KR | 20-0234269 Y1 | 9/2001 |
| KR | 10-2005-0000848 A | 1/2005 |
| (Continued) | | |

OTHER PUBLICATIONS

Koren Office Action (KR 10-2015-0092603), KIPO, dated Mar. 15, 2016.
(Continued)

*Primary Examiner* — Marina A Tietjen
*Assistant Examiner* — Paul J Gray
(74) *Attorney, Agent, or Firm* — Park & Associates IP Law, P.C.

(57) ABSTRACT

A structure for coupling a faucet or a similar device includes: a faucet with a connecting pipe portion extending therefrom; a connecting body with an annular coupling portion formed at one end and connected to a liquid supply source to discharge liquid through the faucet; a fastening nut screw-coupled to the annular coupling portion; a pressing ring coupled to the connecting pipe portion; and a grab ring configured to grab an outer circumference of the connecting pipe portion to have the connecting pipe portion not to be detached from the coupling portion. The fastening nut can be detached from the coupling portion by rotating the faucet and the connecting pipe portion with the engaging configurations of the pressing ring and the fastening nut in engaged position, and an angular position of the faucet can be adjusted to a preferred position in assembly by rotating the (Continued)

faucet and with the engaging configurations of the pressing ring and the fastening nut in disengaged position.

<center>5 Claims, 5 Drawing Sheets</center>

(51) Int. Cl.
    *F16L 19/065*     (2006.01)
    *E03C 1/042*     (2006.01)

(58) Field of Classification Search
    USPC ......... 137/315.2, 359, 360; 285/18, 39, 340, 285/389, 385
    See application file for complete search history.

(56) References Cited

<center>FOREIGN PATENT DOCUMENTS</center>

| | | |
|---|---|---|
| KR | 10-2007-0115388 A | 12/2007 |
| KR | 10-2010-0009210 A | 1/2010 |
| KR | 10-2010-0063411 A | 6/2010 |

<center>OTHER PUBLICATIONS</center>

International Search Report (PCT/KR2016/006952), WIPO, dated Oct. 21, 2016.

\* cited by examiner

US 10,435,873 B2

FAUCET COUPLING STRUCTURE

REFERENCE TO RELATED APPLICATIONS

This is a continuation in part of International Patent Application PCT/KR2016/006952 filed on Jun. 29, 2016, which designates the United States and claims priority of Korean Patent Application No. 10-2015-0092603 filed on Jun. 30, 2015, the entire contents of which are incorporated herein by reference.

FIELD OF THE INVENTION

The present invention relates to a structure for coupling a faucet or similar device to a water/liquid supply source, and more particularly, to a structure for coupling a faucet or another kind of liquid supply device to a liquid supply source, which allows the faucet (or another kind of liquid supply device) to be conveniently connected to the liquid supply source, while enabling adjustments of the connection angle of the faucet (or another liquid supply device) to be oriented at a desired angle.

BACKGROUND OF THE INVENTION

A water supply unit collectively refers to a device installed in an indoor wall or a similar structure. The water supply unit is supplied with water through piping from a water supply source, and then drains water through a faucet or a drain pipe.

As illustrated in FIG. 1, a water supply unit typically includes a connecting body 100 that connects a water supply pipe to a faucet for dispensing water. The water supply pipe is connected to one end of the connecting body 100, and the faucet is connected to the other end of the connecting body 100. Such a water supply unit is disclosed in Korean Patent Application Publication No. 10-2010-0063411 entitled "Water Supply Unit Having Stop Function" (Jun. 11, 2010).

The connecting body 100 is typically embedded in the wall. More particularly, the connecting body 100 is installed in a casing 200 embedded in the wall, and the connecting body 100 is maintained in a securely fixed state at the installation position. Thus, the connecting body 100 is securely installed without movement in order to fix and support the faucet 300.

The connecting body 100 is connected to the faucet 300 by a threaded engagement. The faucet 300 has a fastening pipe portion with a screw thread, and the fastening pipe portion is coupled to the connecting body 100 by a threaded engagement.

Here, a sealing member (not shown) needs to be strongly compressed in order to prevent water from leaking from the connection point at which the fastening pipe portion and the connecting body 100 are connected to each other. For this, the faucet should sufficiently be rotated until the fastening pipe portion of the faucet does not move any further. However, when the faucet is completely coupled to the connecting body, the faucet is often stopped at an undesired position upon complete rotation of the faucet. It is very difficult to have the faucet positioned at an exact vertical position when the faucet is completely coupled because there exist many determining factors for this, for example, such as elasticity of the sealing member, and the length and number of turns of the screw thread.

Thus, it is often compromised to have the faucet rotated more or less than necessary so that the faucet stops at the exact vertical position. However, if the faucet is rotated more than the optimal degree, an excessive amount of pressure applies to the sealing member, and this causes damages to the sealing member. In contrast, if the faucet is rotated less than the optimal degree, the sealing member cannot be compressed with appropriate pressure, and this causes water to leak.

SUMMARY OF THE INVENTION

The present invention has been made in an effort to solve the above and other problems, and an object of the present invention is to provide a structure for coupling a faucet or similar device to a water/liquid supply source, in which the structure is capable of enabling a user to install a faucet (or similar device) while freely adjusting the angle of the faucet to a desired degree when connecting the faucet (or similar device) to a connecting body. Another object of the present invention is to provide a faucet coupling structure capable of enabling a user to separate a faucet (or similar device) without using a separate tool, thereby improving convenience for maintenance.

According to the present invention, the faucet coupling structure provides a grab ring which is configured to have the connection pipe portion of the faucet not to be detached by itself, a pressing ring which is configured to expand the grab ring and enabling to detach the connecting pipe portion, and a fastening nut which is configured to encase the pressing ring and restrain the pressing ring in position. The connecting pipe portion and the pressing ring rotate together, and the pressing ring can be rotated while selectively engaging with the fastening nut.

Accordingly, the faucet can securely maintain its position in its regular use mode, and the faucet can also be freely rotated after releasing the engagement between the pressing ring and the fastening nut to adjust the angle of the faucet at suitable position in installation mode, while also enabling the fastening nut to be uncoupled from the coupling structure in order to repair and maintain components of the system, by holding and rotating the faucet by hand without using a tool and with the pressing ring and the fastening nut positioned in the engaged position.

According to the present invention, it is possible to install the faucet while freely adjusting the angle of the faucet when connecting the faucet to the connecting body. When separating the faucet, the user can separate the faucet by holding and rotating the faucet by hand without using a separate tool, such that convenience for maintenance is improved.

DETAILED DESCRIPTION OF THE INVENTION

According to the principles of the present invention, the below described faucet coupling structures are proposed in order to easily install the faucet while freely adjusting the angle of the faucet to set at a preferred position, as well as to enable easy detachment of the coupling structure without using special tools to facilitate the maintenance of the components thereof.

In order to accomplish the above described and other objects of the present invention, a faucet coupling structure provides: a faucet with a connecting pipe portion; a connecting body with an annular coupling portion configured to connect to the connecting pipe portion to discharge liquid through the faucet; a fastening nut screw-coupled to the annular coupling portion; a pressing ring coupled to the connecting pipe portion; and a grab ring configured to grab an outer circumference of the connecting pipe portion to have the connecting pipe portion not to be detached from the coupling portion. Accordingly, the fastening nut can be detached from the coupling portion by rotating the faucet and the connecting pipe portion while firstly having the engaging configurations of the pressing ring and the fastening nut positioned in an engaged position, and an angular position of the faucet can be adjusted to a preferred position by rotating of the faucet while firstly having the engaging configurations of the pressing ring and the fastening nut positioned in a disengaged position. The positioning of the engaging configurations can be controlled preferably by an operating nut which is screw-coupled to the connecting pipe portion.

Hereinafter, the present invention will be described in detail with reference to FIGS. 2 to 5.

Figure 1:
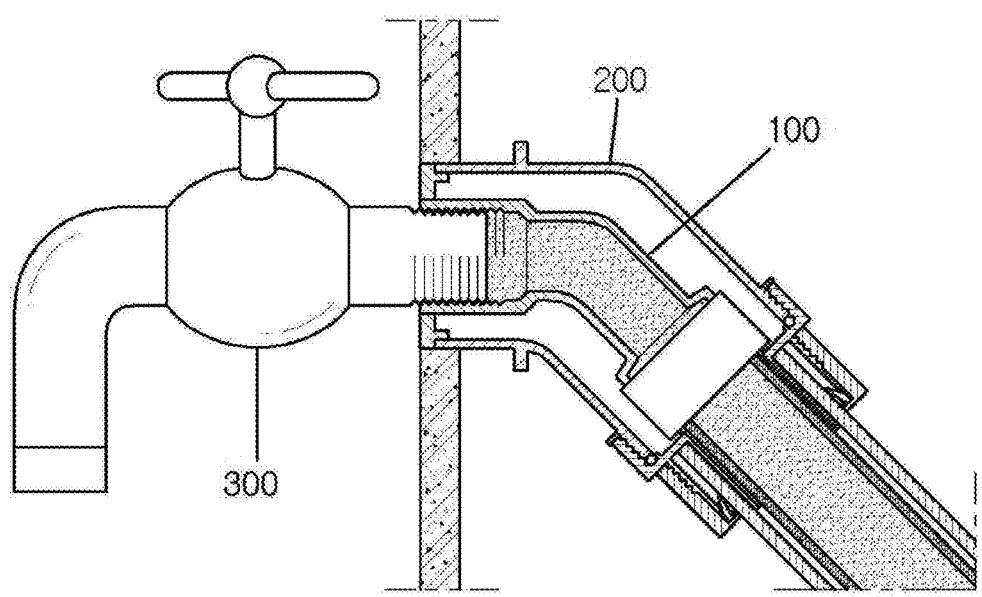
FIG. 1 is a view illustrating an example of a faucet coupling structure in the related art.
Figure 2:
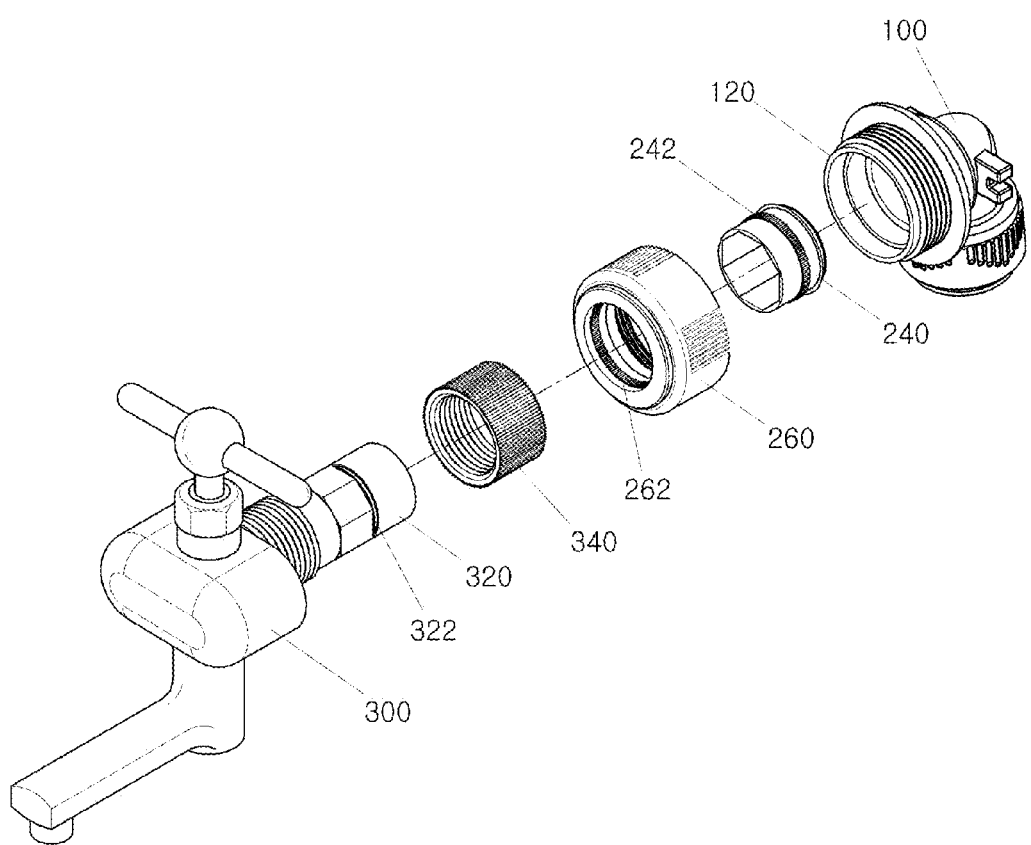
FIG. 2 is an exploded view illustrating a faucet coupling structure according to the present invention.
Figure 3:
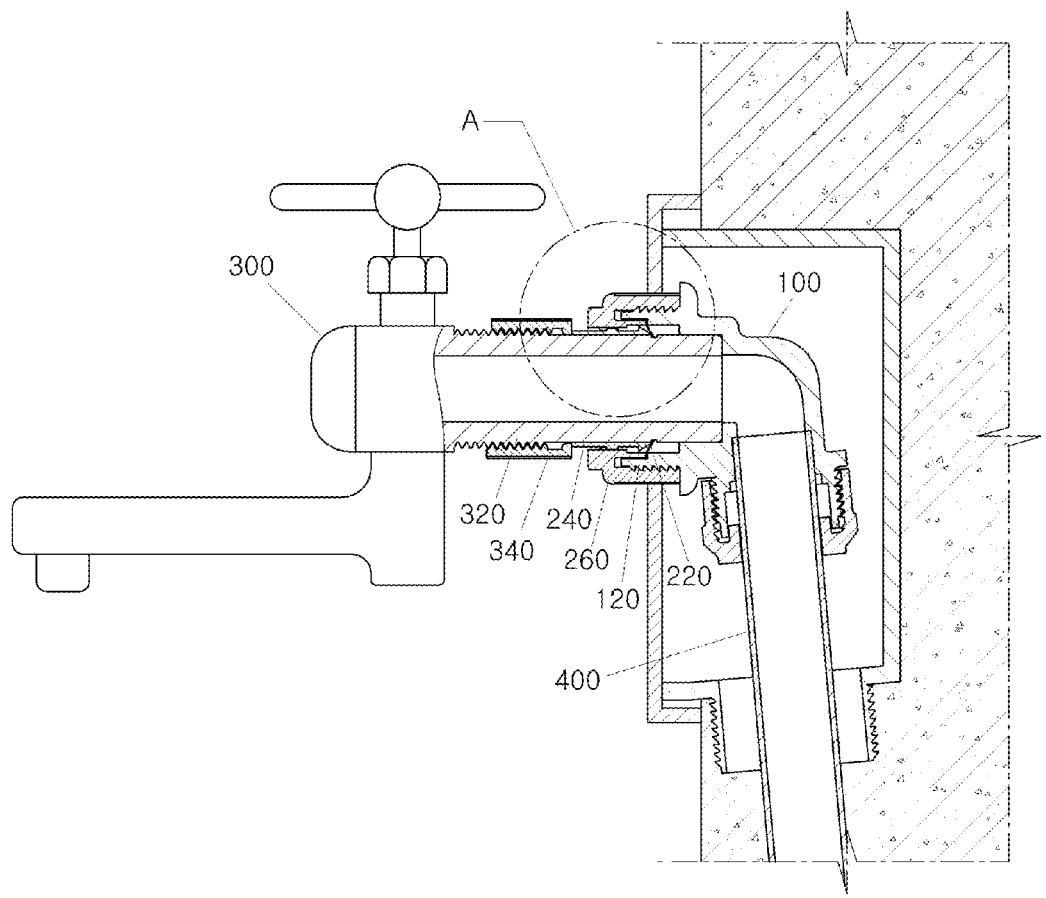
FIG. 3 is a view illustrating, in a cross-sectional view, a state in which a faucet is installed by means of the faucet coupling structure according to the present invention.
Figure 4:
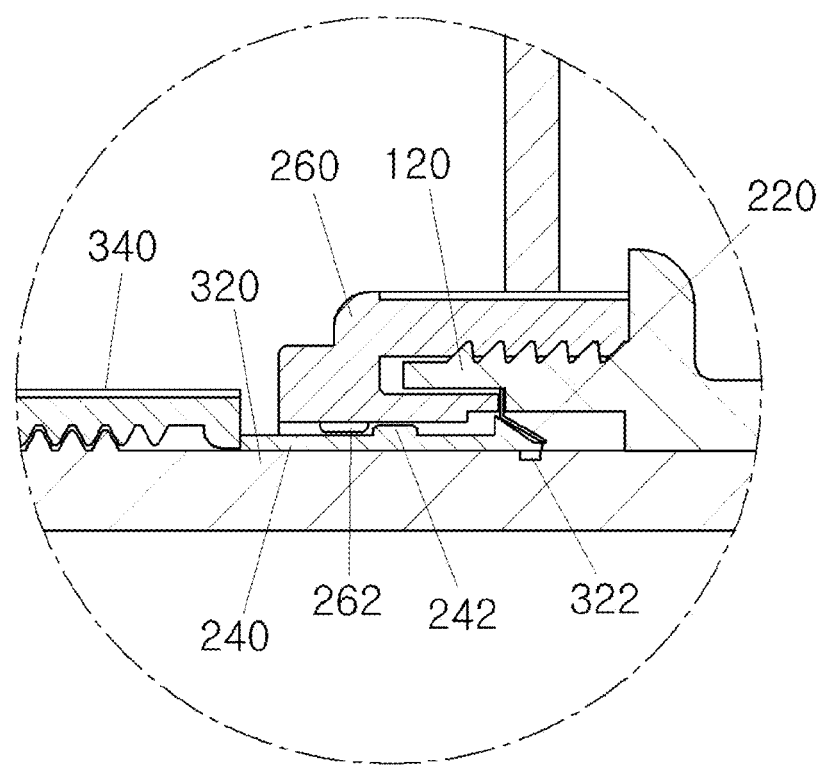
FIG. 4 is an enlarged view of the part "A" in FIG. 3, which illustrates a state in which engaging protrusions are disengaged and the angle of the faucet can be adjusted according to the present invention.
Figure 4A:
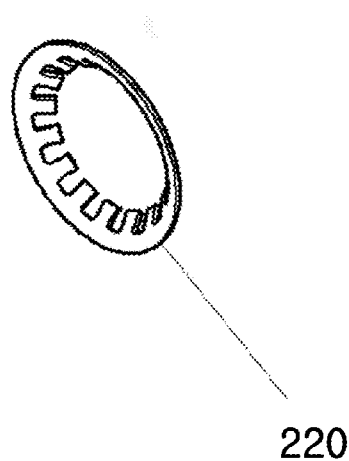
FIG. 4A is an enlarged view of the of the grab ring according to one embodiment of the present invention.
Figure 5:
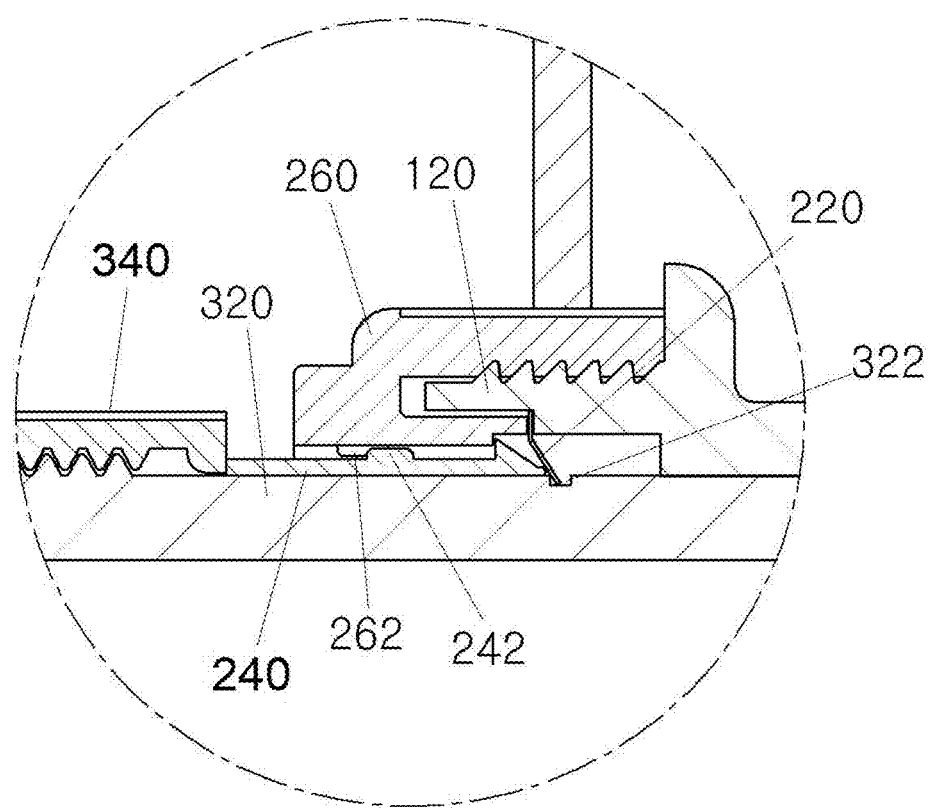
FIG. 5 is an enlarged view of the part "A" in FIG. 3, which illustrates a state in which the engaging protrusions are engaged and a fastening nut can be separated by rotating the faucet according to the present invention.

FIG. 2 is an exploded view illustrating a faucet coupling structure according to the present invention, FIG. 3 is a view illustrating, in a cross-sectional view, a state in which a faucet is installed by means of the faucet coupling structure according to the present invention, FIG. 4 is an enlarged view of the part "A" in FIG. 3, which illustrates a state in which engaging protrusions are disengaged and the angle of the faucet can be adjusted according to the present invention, and FIG. 5 is an enlarged view of the part "A" in FIG. 3, which illustrates a state in which the engaging protrusions are engaged and a fastening nut can be separated by rotating the faucet according to the present invention.

According to the present invention, faucet 300 has a connecting pipe portion 320, and the connecting pipe portion 320 is coupled to a connecting body 100. The connecting body 100 is generally embedded in the wall. A water/liquid supply pipe 400 is connected to one end of the connecting body 100, and a coupling portion 120 is formed at the other end of the connecting body 100. When the connecting body 100 is embedded in the wall, the coupling portion 120 is exposed to the outside of the wall, and the connecting pipe portion 320 of the faucet 300 is engaged with the coupling portion 120. Thus, water/liquid can be supplied to the faucet 300 via the water/liquid supply pipe 400 and the connecting body 100, and dispensed through the faucet 300.

In the present invention, the faucet coupling structure further includes a grab ring 220, a pressing ring 240, a fastening nut 260, and an operating nut 340 for operating the pressing ring 240 in order to couple the connecting pipe portion 320 and the coupling portion 120 together. To prevent a leakage of water/liquid, an appropriate sealing means, for example, a sealing ring or gasket can be provided to seal a gap between the connecting pipe portion 320 and the coupling portion 120.

The grab ring 220 has a ring shape and has teeth that protrude toward the center of the grab ring 220. The teeth are inclined toward the inner direction of the coupling portion 120. The grab ring 220 is installed within the coupling portion 120 in a manner such that the connecting pipe portion 320 is inserted through the grab ring 220. Thus, when the connecting pipe portion 320 of the faucet 300 is inserted in the coupling portion 120, the end of the connecting pipe portion 320 pushes the teeth as it moves forward, and as a result, the connecting pipe portion 320 can be inserted through the grab ring 220. On the contrary, when the connecting pipe portion 320 is moved backward, the teeth cause friction with the outer circumferential surface of the connecting pipe portion 320, and as a result, the connecting pipe portion 320 is not easily pulled out. In addition, a catching groove 322 can be formed in the outer circumference of the connecting pipe portion 320, and in this configuration, the end portions of the teeth of the grab ring 220 are to be caught by the catching groove 322, preventing the connecting pipe portion 320 from being pulled out.

The pressing ring 240 has an annular tube shape and a predetermined length, and the connecting pipe portion 320 is inserted in the pressing ring 240. The pressing ring 240 is moved forward and backward along the connecting pipe portion 320. When the pressing ring 240 is moved forward, the front end of the pressing ring 240 pushes the teeth of the grab ring 220, and the grab ring 220 is expanded while stretching the teeth. When the connecting pipe portion 320 is moved backward in this state, the connecting pipe portion 320 can be pulled out and separated from the coupling portion 120.

Here, if the pressing ring 240 is excessively moved forward, the front end of the pressing ring 240 may pass the grab ring 220. Thus, the forward moving distance of the pressing ring 240 should be calculated in advance, and be appropriately adjusted. The front end of the pressing ring 240 is inclined in the shape of an arrow, such that the end of the pressing ring 240 can push the teeth while obliquely coming into contact with the teeth.

In the present invention, the operating nut 340 is disposed at the outer circumference of the connecting pipe portion 320 in order to move the pressing ring 240 forward. The operating nut 340 is thread-coupled to the outer circumference of the connecting pipe portion 320, such that the operating nut 340 can be moved forward and backward along the connecting pipe portion while rotating therearound. When the operating nut 340 is moved forward, the front end of the operating nut 340 pushes the rear end of the pressing ring 240 so that the pressing ring 240 is moved forward toward the grab ring 220. Since the operating nut 340 is thread-coupled to the connecting pipe portion 320, the operating nut 340 can be stopped at a particular location on the connecting pipe portion 320, and the operating nut 340 can maintain its pushing state of pushing the pressing ring 240 to the particular position.

The pressing ring 240 and the connecting pipe portion 320 of the faucet 300 are engaged with each other so as to be rotated simultaneously. For this, the interior surface of the pressing ring 240 is formed in a polygonal shape, and the portion of the connecting pipe portion 320 to be inserted in the pressing ring 240 is formed in the polygonal shape corresponding to the shape of the interior surface of the pressing ring 240, and thus, the pressing ring 240 and the connecting pipe portion 320 can be rotated together. By this configuration, the pressing ring 240 is rotated together with the connecting pipe portion 320 when the connecting pipe portion 320 is rotated. This configuration also enables the fastening nut 260 to be rotated together with the connecting pipe portion 320.

The fastening nut 260 is shaped to surround the pressing ring 240, and the fastening nut 260 is fastened to the coupling portion 120. The inner diameter of the fastening nut 260 is slightly greater than the outer diameter of the pressing ring 240, such that the fastening nut 260 is coupled to the pressing ring 240 while surrounding. In a state in which the fastening nut 260 is coupled to the coupling portion 120, the front end of the pressing ring 240 is caught by the fastening nut 260. Thus, the pressing ring 240 is not to be separated from the fastening nut 260. Meanwhile, in the state in which the fastening nut 260 is coupled to the coupling portion 120, the rear end of the pressing ring 240 is exposed to the outside of the fastening nut 260, and the pressing ring 240 is to be moved forward as the exposed rear end of the pressing ring 240 is pushed by the operating nut 340.

The pressing ring 240 and the fastening nut 260 are selectively engaged with each other. Thus, when the connecting pipe portion 320, which is inserted in the coupling portion 120 while penetrating the pressing ring 240, is rotated in the state in which the pressing ring 240 and the fastening nut 260 are engaged with each other (as shown in FIG. 5), the fastening nut 260 is rotated together with the connecting pipe portion 320. Here, since the pressing ring 240 and the connecting pipe portion 320 of the faucet 300 are engaged with each other, the pressing ring 240 is rotated together with the connecting pipe portion 320 when the connecting pipe portion 320 is rotated, and as a result, the fastening nut 260 is rotated together with the pressing ring 240 and the connecting pipe portion 320.

According to the configuration described above, the fastening nut 260 can be coupled to or separated from the coupling portion 120 without using a separate tool. In the conventional art, however, it is necessary to rotate the fastening nut by using a separate tool in order to couple and separate the fastening nut. In contrast, the fastening nut 260 of the present invention can be coupled to or separated from the coupling portion 120 without using a separate or special tool because the fastening nut 260 can easily be rotated by rotating the faucet 300 while holding it by hand.

Meanwhile, when the pressing ring 240 and the fastening nut 260 are disengaged from each other (as shown in FIG. 4), the user can adjust the angle of the faucet by rotating the faucet 300 and the connecting pipe portion 320 as the connecting pipe portion 320 can be rotated while the fastening nut 260 is coupled to the coupling portion 120. Thus, the user can readily adjust the angular position of the faucet 300 by rotating the faucet to a desired angle while without separating the components for coupling the faucet 300 to the connecting body 100, for example, the components such as the grab ring 220, the pressing ring 240, and the fastening nut 260.

The configuration in which the pressing ring 240 and the fastening nut 260 are selectively to be engaged with each other can be embodied, for example, by means of engaging configurations (e.g., protrusions 242 and 262) which are formed at the outer circumference of the pressing ring 240 and the inner circumference of the fastening nut 260, respectively. The engaging protrusions 242 and 262 can be embodied in various forms. For example, the engaging protrusions 242 and 262 can be in the form continuously protruded while defining a serrated or gear-like structure, namely, matching gear or serrations formed in the pressing ring 240 and the fastening nut 260. Thus, the engaging protrusions formed at the outer circumference of the pressing ring 240 and the engaging protrusions formed at the inner circumference of the fastening nut 260 are engaged with one another. In this case, the engaging protrusions 242 and 262 can be positioned at the positions in which the engaging protrusions 242 and 262 can be disengaged when the pressing ring 240 is moved by a predetermined distance toward the grab ring 220, and thus, it is possible to selectively rotate the connecting pipe portion 320 with respect to the fastening nut 260.

When the pressing ring 240 is moved forward toward the grab ring 220 in order to disengage the engaging protrusions 242 and 262 from each other, the front end of the pressing ring 240 pushes the grab ring 220. Thus, when force for forwardly pushing the pressing ring 240 is eliminated, the pressing ring 240 returns back to the original position by being elastically pushed by the grab ring 220, and the engaging protrusions 242 and 262 of the two members engage again.

Hereinafter, the process of coupling the faucet 300 to the connecting body 100, the process of adjusting the angle of the faucet 300, and the process of uncoupling the faucet 300 from the apparatus according to the present invention are described. As described above, the water supply pipe is connected to one end of the connecting body 100 embedded in the wall, and the coupling portion 120 is formed at the other end of the connecting body 100 and exposed to the outside of the wall. In this state, the process of coupling the faucet 300 to the connecting body 100 is described below as a preferred/exemplary embodiment of the present invention.

First, a sealing member (e.g., O-ring) and grab ring 220 are sequentially inserted into the coupling portion 120. Next, the pressing ring 240 is inserted in the coupling portion 120, and the fastening nut 260 is fastened to the coupling portion 120. In this state, the engaging protrusions 242 and 262 respectively formed on the pressing ring 240 and the fastening nut 260 are engaged with each other, while the rear end of the pressing ring 240 is exposed outside from the fastening nut 260. In this manner, the pressing ring 240 cannot be separated from the fastening nut 260 unless the fastening nut is first separated.

The fastening nut 260 can be tightened by a separate tool. Because the faucet 300 is not yet coupled to the apparatus, such tool can be freely used and the fastening nut 260 can securely be fastened by the tool.

After the fastening nut 260 is completely fastened as described above, the faucet 300 is coupled to the connecting body 100. The connecting pipe portion 320 of the faucet 300 is pushed into the pressing ring 240, and the connecting pipe portion 320 sequentially penetrates the pressing ring 240 and the grab ring 220, and is inserted in the internal space of the coupling portion 120. Here, the connecting pipe portion 320 is pushed until the teeth of the grab ring 220 are caught by the catching groove 322 formed at the outer circumference of the connecting pipe portion 320, and the connecting pipe portion 320 cannot be separated from the coupling portion 120. Here, the operating nut 340 is previously coupled to the connecting pipe portion 320.

Thereafter, the angle of the faucet 300 is adjusted. For this, the pressing ring 240 is first pushed forward by tightening the operating nut 340, and then, the angle of the faucet 300 is adjusted by rotating the faucet 300. That is, when the pressing ring 240 is moved forward, the engaging protrusions 242 and 262 of the pressing ring 240 and the fastening nut 260 are disengaged as illustrated in FIG. 4. The angle of the faucet 300 can easily be adjusted in this state as the connecting pipe portion 320 and the pressing ring 240 rotate together.

Here, when the pressing ring 240 is pushed to further move forward by tightening the operating nut 340 as described above, the front end of the pressing ring 240 pushes the teeth of the grab ring 220, and thus expands the grab ring 220. Thus, the connecting pipe portion 320 can be in a state enabling separation from the coupling portion 120.

After completely adjusting the angle to a desired degree, the user untightens the operating nut 340. As the operating nut 340 is untightened, the pressing ring 240 returns back to the original position by being pushed by the grab ring 220. As a result, as illustrated in FIG. 5, the engaging protrusions 242 and 262 respectively formed on the pressing ring 240 and the fastening nut 260 are engaged with each other. Thus, the position of the faucet 300 is fixed in a state in which the rotation of the faucet 300 is restricted.

When it is necessary to uncouple the fastening nut 260 from the coupling portion 120 in order to repair or replace the components, such as, the grab ring 220, the sealing member, and the pressing ring 240 installed to the coupling portion 120, the user merely rotates the faucet 300 in the direction that the fastening nut 260 is to be released. When the faucet 300 is rotated, the connecting pipe portion 320 is rotated, and as a result, the pressing ring 240 and the fastening nut 260 are rotated together, such that the fastening nut 260 can be released and separated from the coupling portion 120 (as shown in FIG. 5). In this case, the user can hold and rotate the faucet 300 by hand, and as a result, the user can easily uncouple and detach the fastening nut 260 without using a separate or special tool. Of course, it is also possible to reattach and fasten the fastening nut 260 to the coupling portion 120 by rotating the faucet 300 in the opposite direction.

What is claimed is:

1. A structure for coupling a faucet to a liquid supply device, the liquid supply device including a coupling portion at a proximal area of the liquid supply device, wherein the coupling structure comprises:
   a faucet for discharging liquid, the faucet including a connecting pipe portion extending in a longitudinal direction from the faucet, a distal end of the connecting pipe portion configured to be detachably coupled to the coupling portion of the liquid supply device;
   a fastening nut coupled to the coupling portion of the liquid supply device by screw connection;
   a pressing ring coupled to the connecting pipe portion and disposed between the connecting pipe portion and the fastening nut; and
   a grab ring installed in an internal area of the coupling portion of the liquid supply device and configured to grab an outer circumference of the connecting pipe portion so as to have the connecting pipe portion not to be detached from the coupling portion,
   wherein the pressing ring is rotatable together with the connecting pipe portion and reciprocally moveable by linear sliding in the longitudinal direction of the connecting pipe portion, and the connecting pipe portion is detachable from the coupling portion when the pressing ring is moved toward the coupling portion expanding the grab ring,
   wherein the pressing ring and the fastening nut include engaging protrusions formed at an outer circumference of the pressing ring and an inner circumference of the fastening nut, respectively, the engaging protrusions of the pressing ring configured to selectively couple to, and uncouple from, the engaging protrusions of the fastening nut by a reciprocal linear-sliding movement of the pressing ring in the longitudinal direction of the connecting pipe portion,
   wherein the fastening nut can be detached from the coupling portion by rotating the faucet and the connecting pipe portion while having the engaging protrusions of the pressing ring and the fastening nut positioned in an engaged position with the pressing ring and the fastening nut coupled to each other by sliding movement of the pressing ring away from the coupling portion, and
   wherein an angular position of the faucet can be adjusted to a preferred position in assembly by rotating the faucet while having the engaging protrusions of the pressing ring and the fastening nut positioned in a disengaged position with the pressing ring and the fastening nut uncoupled from each other by sliding movement of the pressing ring toward the coupling portion.

2. The structure of claim 1, further comprising an operating nut coupled to the connecting pipe portion by screw connection, and wherein the operating nut is configured to push the pressing ring, upon rotation of the operating nut, in the longitudinal direction of the connecting pipe portion to position the engaging protrusions in the disengaged position.

3. The structure of claim 2, wherein the engaging protrusions of the pressing ring and the fastening nut return to the engaged position by elastic force of the grab ring when the operating nut is rotated in an opposite direction to eliminate a pushing force to the pressing ring.

4. A structure for coupling a liquid discharge device to a liquid supply device, the liquid supply device including a coupling portion at a proximal area of the liquid supply device, wherein the coupling structure comprises:
   a liquid discharge device for discharging liquid, the liquid discharge device including a connecting pipe portion extending in a longitudinal direction, a distal end of the connecting pipe portion configured to be detachably coupled to the coupling portion of the liquid supply device;
   a fastening nut coupled to the coupling portion of the liquid supply device by screw connection;
   a pressing ring coupled to the connecting pipe portion and disposed between the connecting pipe portion and the fastening nut; and
   a grab ring installed in an internal area of the coupling portion of the liquid supply device and configured to grab an outer circumference of the connecting pipe portion so as to have the connecting pipe portion not to be detached from the coupling portion,
   wherein the pressing ring is rotatable together with the connecting pipe portion and reciprocally moveable by linear sliding in the longitudinal direction of the connecting pipe portion, and the connecting pipe portion is detachable from the coupling portion when the pressing ring is moved toward the coupling portion expanding the grab ring,
   wherein the pressing ring and the fastening nut include engaging protrusions formed at an outer circumference of the pressing ring and an inner circumference of the fastening nut, respectively, the engaging protrusions of the pressing ring configured to selectively couple to, and uncouple from, the engaging protrusions of the fastening nut by a reciprocal linear-sliding movement of the pressing ring in the longitudinal direction of the connecting pipe portion, wherein the fastening nut can be detached from the coupling portion by rotating the liquid discharge device and the connecting pipe portion while having the engaging protrusions of the pressing ring and the fastening nut positioned in an engaged position with the pressing ring and the fastening nut coupled to each other by sliding movement of the pressing ring away from the coupling portion, and wherein an angular position of the liquid discharge device can be adjusted to a preferred position in assembly by rotating the liquid discharge device while having the engaging protrusions of the pressing ring and the fastening nut positioned in a disengaged position with the pressing ring and the fastening nut uncoupled from each other by sliding movement of the pressing ring toward the coupling portion.

5. The structure of claim 4, wherein the engaging protrusions are in the form of a plurality of engaging protrusions formed in the pressing ring and the fastening nut, the engaging protrusions of the pressing ring configured to selectively couple to, and uncouple from, the engaging protrusions of the fastening nut when the pressing ring is moved away from and toward the coupling portion, respectively.

* * * * *